US010691663B2

(12) United States Patent
Schalk

(10) Patent No.: US 10,691,663 B2
(45) Date of Patent: Jun. 23, 2020

(54) DATABASE TABLE COPY

(71) Applicant: SAP SE, Walldorf (DE)

(72) Inventor: Michael Schalk, Leingarten (DE)

(73) Assignee: SAP SE, Walldorf (DE)

( * ) Notice: Subject to any disclaimer, the term of this patent is extended or adjusted under 35 U.S.C. 154(b) by 281 days.

(21) Appl. No.: 14/487,524

(22) Filed: Sep. 16, 2014

(65) Prior Publication Data

US 2016/0078023 A1    Mar. 17, 2016

(51) Int. Cl.
*G06F 16/22* (2019.01)
*G06F 16/23* (2019.01)

(52) U.S. Cl.
CPC ...... *G06F 16/2282* (2019.01); *G06F 16/2386* (2019.01)

(58) Field of Classification Search
CPC ................... G06F 17/30839; G06F 17/3038
USPC ....................................................... 707/825
See application file for complete search history.

(56) References Cited

U.S. PATENT DOCUMENTS

| 5,418,950 | A * | 5/1995 | Li ..................... G06F 17/30398 |
| | | | 707/769 |
| 7,548,898 | B1 * | 6/2009 | Tarenskeen ........... G06F 17/303 |
| 8,775,471 | B1 * | 7/2014 | Kozyrczak ........ G06F 17/30861 |
| | | | 707/748 |
| 2007/0239663 | A1 * | 10/2007 | Dyskant ............ G06F 17/30445 |
| | | | 707/999.002 |
| 2013/0166557 | A1 * | 6/2013 | Fricke ............... G06F 17/30442 |
| | | | 707/737 |
| 2014/0095472 | A1 * | 4/2014 | Lee ................... G06F 17/30466 |
| | | | 707/714 |
| 2014/0156636 | A1 * | 6/2014 | Bellamkonda .... G06F 17/30489 |
| | | | 707/718 |
| 2014/0214799 | A1 * | 7/2014 | Li ..................... G06F 17/30445 |
| | | | 707/718 |
| 2014/0214800 | A1 * | 7/2014 | Liang ................ G06F 17/30445 |
| | | | 707/718 |
| 2014/0229424 | A1 * | 8/2014 | Gislason ........... G06F 17/30339 |
| | | | 707/602 |
| 2014/0279914 | A1 * | 9/2014 | Bester .................. G06F 16/254 |
| | | | 707/640 |

(Continued)

OTHER PUBLICATIONS

Nuss, Kevin Matthew, "Parallel Copying Tools for Distributed File Systems" (2013). Computer Science Graduate Projects and Theses. 4. http://scholarworks.boisestate.edu/cs_gradproj/4.*

*Primary Examiner* — Pierre M Vital
*Assistant Examiner* — Alicia M Antoine
(74) *Attorney, Agent, or Firm* — Mintz Levin Cohn Ferris Glovsky and Popeo, P.C.

(57) ABSTRACT

A computer-implemented method for copying data records from a first table residing in a database to a second table involves selecting a column of the first table as a parallelization column, identifying a number of distinct data record field values in the parallelization column of the first table and identifying a corresponding number of copy groups of data records. Each copy group of the data records includes the data records of the first table, which have the same distinct data record field value in the parallelization column of the first table. The method further involves setting up a corresponding number of copy processes; each copy process is configured to copy a respective copy group of data records from the first table to the second table.

17 Claims, 9 Drawing Sheets

(56) References Cited

U.S. PATENT DOCUMENTS

| | | | | |
|---|---|---|---|---|
| 2015/0019488 A1* | 1/2015 | Higginson | ............ | G06F 17/303 707/634 |
| 2015/0074151 A1* | 3/2015 | Chaiken | ............ | G06F 17/30569 707/803 |
| 2015/0356138 A1* | 12/2015 | Anderson | ......... | G06F 16/24532 707/764 |
| 2016/0063050 A1* | 3/2016 | Schoen | ................ | G06F 17/303 707/690 |

* cited by examiner

STABLE_CONTENT_COPY2

Source
- 801 → ● Database
- 801a → Connection [         🔍]
- 801b → Schema [SAPRIX]
- 301 → Table [STLOGMI_SRC]
- 802 → ○ Class
- 802a → Class Name [         ]

[Show/Hide Filter]

Target
- 803 → ● Database
- 803a → Connection [         ]
- 803b → Schema [SAPRIX]
- 302 → Table [STLOGMI_TGT]
- 804 → ○ Class
- 804a → Class Name [         ]

Processing
- 303 → Package Size [1.000]
- 304 → LUW Size [1.000]
- 305 → Maintenance Interval (#rows) [100.000.000]
- → Optimize Compression ☑
- 306 → Parallel Processes [10]
- 307 → Parallelization Column
  - 307a → ● Auto-Detect
  - 307b → ○ Predefined [         ]
- 308 → Client Adaption
  - 308a → ○ Active
  - 308b → ● All
  - 308c → ○ Specific [ ] [📄]
  - 308d → ● Inactive
- 805 → Map & Transform Class [         ]

309 → [Check]

FIG. 8

DATABASE TABLE COPY

BACKGROUND

A database may store data organized, for example, as tables (consisting of rows of data records and columns, which mark or indicate data record field attributes). A database management system (DBMS) may include software applications specially designed, for example, for the definition, creation, querying, update, and administration of the database. The software applications may allow interaction with a user, other applications (e.g., business applications), and the database itself, for example, to capture and analyze data.

A business or organization may store a large number of data records (e.g., millions of data records) in a database. Often while using or administering the database, there may be a need to copy portions of the stored data, for example, to another database, client computer or business application. The database may include a built-in "copy" feature or tool for copying database tables. However, commonly available database copy tools may have performance limitations (e.g., in efficiently copying a large amount data) at least when used in some integrated technology platforms or with some database types. Further, the built-in database copy feature or tool may not be available or accessible to external users (e.g., business application users) of the database without implementing elaborate access and authorization procedures.

Consideration is now being given to database copy features and tools that are useful in a variety of circumstances including, for example, copying of large amounts of data, and copying of data in a parallel mode. Attention is directed to increasing the efficiency of database copy tools and to database copy tools that can be triggered from within business application computing platforms.

SUMMARY

A database copying tool, which may be hosted on one or more physical or virtual machines in a computer network, is described herein. The database copying tool may be integrated with or included in a business programming application, which can be used to interact with a database (e.g., define, create, query, update, and administer the database).

In a general aspect, a computer system includes a database copying tool that is configured to copy data records from a first table residing in a database to a second table. The database copying tool, which can be hosted on one or more networked computers, includes a copy controller, a database interface configured to provide the copy controller access to the database on which the first table resides, and a copy task generator. The copy task generator is configured to generate multiple instances of copying processes for copying data from the first table over to the second table. The copy controller is configured to categorize or group data records in the first table into a multiplicity of parallel copy groups, and to copy the multiplicity parallel copy groups over to target table in parallel by using the corresponding multiplicity of parallel instances of the copying processes generated by copy task generator.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 5 is an illustration of an example Class diagram for a database interface used by the database copying tool of FIG. 2 to interact with a database on which source database table resides, in accordance with the principles of the disclosure herein.

FIG. 8 is a schematic illustration of another user interface generated by a database copying system for receiving input parameters to configure and setup the parallel copying processes or tasks to copy contents of the source database table to the target table, in accordance with the principles of the disclosure herein.

DETAILED DESCRIPTION

Systems and methods ("solutions") for copying database contents (e.g., database tables) from one database to the same database or another database or client computer are described herein.

Figure 1:
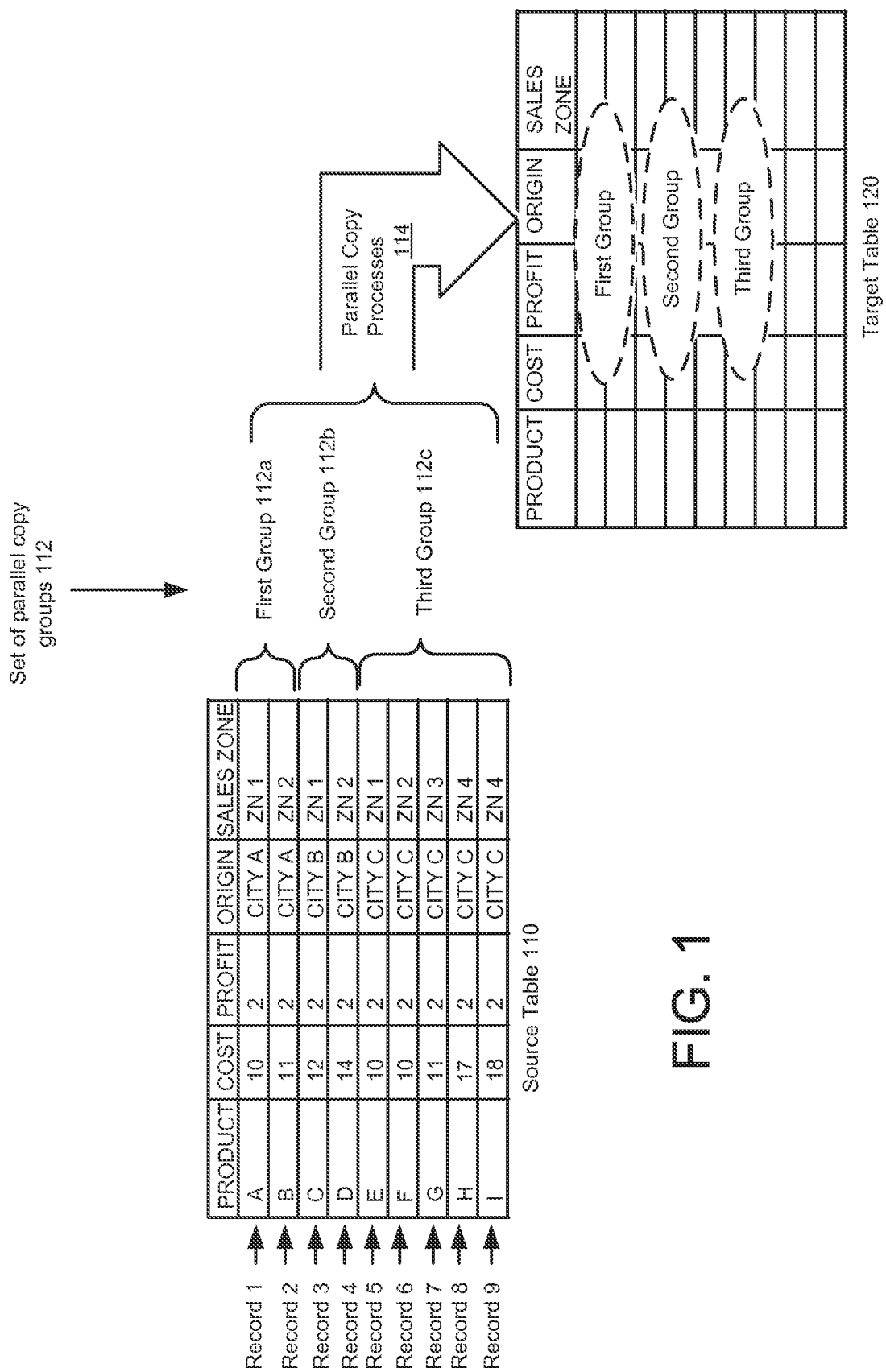
FIG. 1 is a schematic illustration of an example solution for copying database contents, in accordance with the principles of the disclosure herein.

FIG. 1 shows schematically an example solution 100 for copying database contents, in accordance with the principles of the present disclosure. In the example shown in the figure, for purposes of illustration, the database contents may be represented by a source table 110. Source table 110 may be copied over to an example target table 120 using the copying solutions described herein. Each of source table 110 and target table 120 may be a set of data elements (values) using a model of vertical columns (which are identified by their name) and horizontal rows or data records. It will be understood that source table 110 is shown as containing a limited number of data records (i.e. nine Records 1-9) in FIG. 1 only for purposes of illustrating the principles of the database copying solutions described herein. In actual database scenarios in which the database copying solutions described herein may be applied, source table 110 may include a much larger number of data records (e.g., thousands or millions of data records).

Source table 110, as shown in FIG. 1, may, for example, include data regarding products (e.g. products A, B, C . . . I, etc.) of a company. The data may be structured in source table 110, for example, as horizontal rows or data records (e.g., records 1-9, etc.) on products (e.g. products A, B, C . . . I) of the company. Each data record (e.g., records 1-9, etc.) may include a data record field values under respective field or column headings (e.g., Product, Cost, Profit, Origin, and Sales Zone). A primary key (e.g., product) in source table 110 may uniquely identify each data record in source table 110. For example, records 1-9 in source table 110 may be uniquely identified by primary key (product) values A, B, C, . . . , and I. The copying solutions described herein may involve using parallel copying processes or tasks to copy multiple groups of the data records in source table 110, in parallel, over to target table 120.

In an example implementation of the copying solutions, the data records in source table 110 (e.g., records 1-9) may be categorized or grouped into a set (e.g., set 112) of a number of "parallel copy groups" by selecting one of the columns (e.g., Product, Cost, Profit, Origin, and Sales Zone) in source table 110 as a "Parallelization Column" and considering the data record field values in the Parallelization Column. Data records having a common or same data field value in the Parallelization Column may be grouped together in a same parallel copy group. For example, when Origin is selected as the Parallelization Column, records 1 and 2 (having the common origin data field value "CITY A") may be grouped in a first parallel copy group 112a in set 112, records 3 and 4 (having the common origin data field value "CITY B") may be grouped together in a second parallel copy group 112b in set 112, and records 5-9 (having the common origin data field value "CITY C") may be may be grouped together in a third parallel copy group 112c in set 112. Each of the three parallel copy groups (e.g., first, second and third parallel copy groups 112a-112c) in the set of parallel copy groups (e.g., set 112) may be copied over in parallel from source table 110 to target table 120 (e.g., using parallel copy processes or tasks 114).

The number of parallel copy groups in set 112 and the distribution of the data records (e.g., records 1-9) amongst the parallel copy groups in set 112 may depend on which column (e.g., Product, Cost, Profit, Origin, or Sales Zone) in source table 110 is selected as the Parallelization Column. For example, when Sales Zone is selected (instead of Origin as in the example above) as the Parallelization Column, records 1, 3 and 5 (having the common sales zone data field value "Zn 1") may be grouped together in a first parallel copy group (not shown), records 2, 4 and 6 (having the common sales zone data field value "Zn 2") may be grouped together in a second parallel copy group (not shown), record 7 (having the sales zone data field value "Zn 3") may be grouped by itself as a third parallel copy group (not shown), and records 8 and 9 (having the sales zone data field value "Zn 4") may be grouped together as a fourth parallel copy group (not shown). Further, for example, when Profit is selected as the Parallelization Column, all records 1-9 (having the common profit data field value "2") may be trivially grouped together as a single parallel copy group in set 112. Similarly, for example, when Product (i.e., the primary key) is selected as the Parallelization Column, each of records 1-9 having a unique product data field value (e.g., A, B, C, . . . , I) may be trivially considered to form its own parallel copy group (one of nine) in set 112.

An aspect of the implementations of the database copying solutions, in industry or business database scenarios, may involve choosing a degree of parallelized copying (i.e., the number of parallel copy processes 114 utilized) that is compatible with the available computing resources and database infrastructure. The degree of parallelized copying may be limited by selecting or identifying a column as the Parallelization Column in which the number of distinct data record field values (e.g., CITY A, CITY B and CITY C in column Origin, as discussed above with reference to FIG. 1) results in a limited number of parallel copy groups. The trivial case of a column having only one distinct value (e.g., common profit data field value "2" in column Profit, as discussed above), which results in a single parallel copy group, does not permit any parallelization at all. Selecting a column (e.g., column Product) having a number of distinct values equal to the number of data records in the source table would require a separate parallel copy process or task for each data record. While parallel copying of the all of the individual data records in a table may sound appealing, it is likely that, at least for large tables, an administrative overhead of managing a large number of short running separate parallel copy processes would outweigh actual copy processing times.

A further consideration in selecting a column as the Parallelization Column, relates to the sizes of the resulting parallel copy groups (e.g., in set 112) that are to be copied in parallel to target table 120. A total parallel copy time for set 112 may be bounded by the size of the largest parallel copy group in set 112. The column selected as the Parallelization Column may be selected so that the sizes of the resulting parallel copy groups in set 112 are such the total parallel copy time for set 112 is less than a predetermined time-out limit for parallel copy processes 114 (which may, for example, be run as time-limited dialog processes on some integrated technology platforms (e.g., NetWeaver ABAP)). Further, the column selected as the Parallelization Column may be selected so that the sizes of each of the resulting parallel copy groups are smaller than a size (e.g., 1 million data records) of buffer memory that may available for use by the parallel copying processes (e.g., parallel copy processes 114).

For time efficient parallel copying of source table 110 to target table 120, an optimal average size of the parallel copy groups in set 112 in some database environments (e.g., ABAP system environments) may be about 100,000 data records. Further, based on consideration of buffer memory usage and availability in such environments, an optimal maximum size of the parallel copy groups in set 112 may be about 1 million data records.

The various database copying solutions described herein may utilize database copying tools, which are configured to use parallel copying processes or tasks to copy contents of a database table (e.g., a source table) to a target table.

Figure 2:
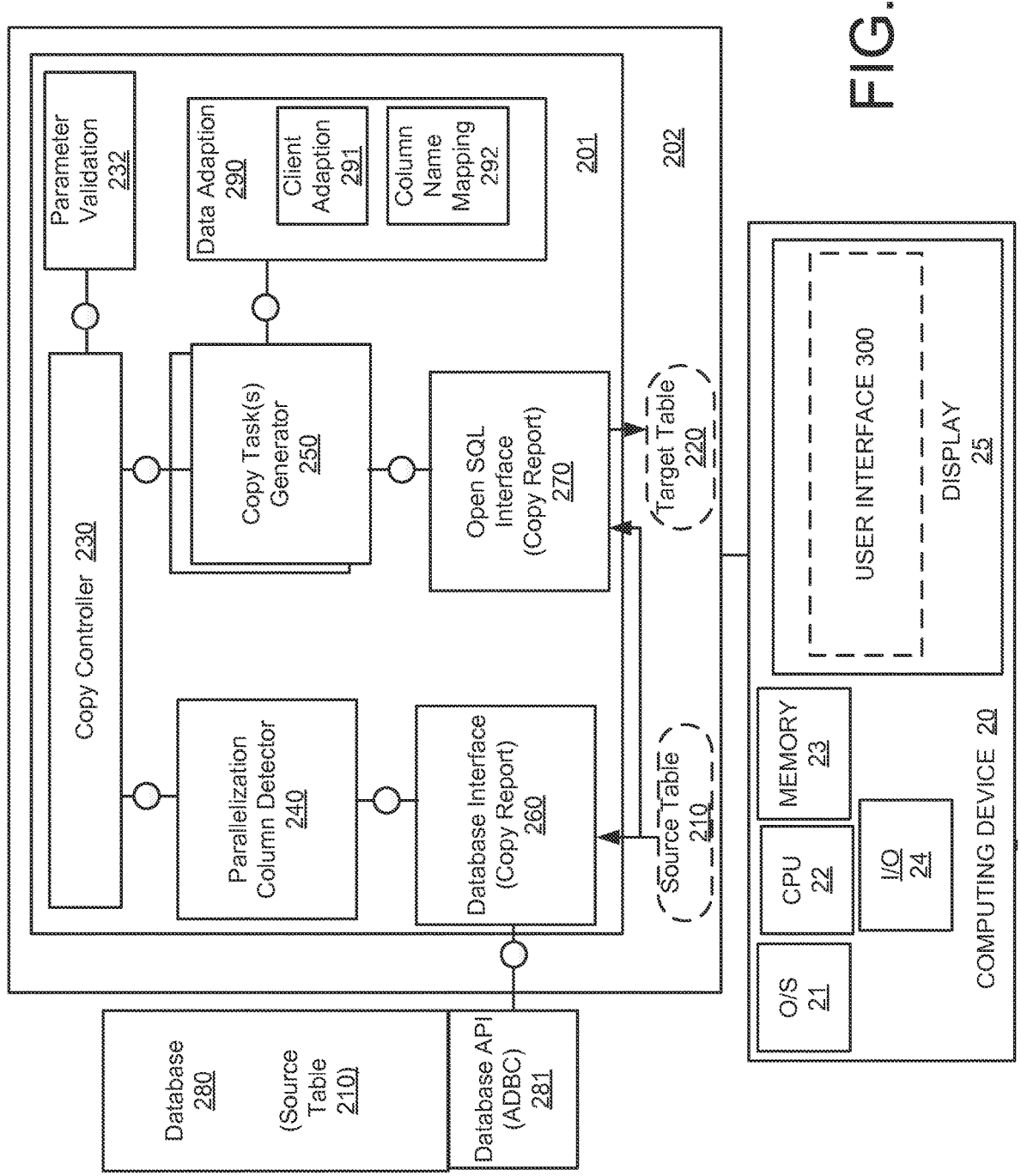
FIG. 2 is a block diagram illustrating components of an example database copying system, which includes a database copying tool that is configured to use parallel copying processes or tasks to copy contents of a source database table to a target table, in accordance with the principles of the disclosure herein.

FIG. 2 is a block diagram illustrating components of an example database copying system 200, which includes database copying tool 201 that is configured to use instances of parallel copying processes or tasks (e.g., generated or executed by Copy Task Generator 250) to copy contents of a source table 210 to a target table 220, in accordance with the principles of the disclosure herein.

Database copying tool 201 may, for example, include a Copy Controller 230 coupled to a Parameter Validation Module 232, a Parallelization Column Detector 240, a Database Interface 260, and a Parallel Copy Process or Task Generator (e.g., Copy Task Generator 250). Database copying tool 201/Copy Controller 230 may be configured access the database on which source database table 210 resides using methods of Database Interface 260. Database copying tool 201/Copy Controller 230 may be further configured to categorize or group data records in source table 210 into a multiplicity of parallel copy groups, and to copy the multiplicity parallel copy groups over to target table 220 in parallel using a corresponding multiplicity of parallel instances of copying processes or tasks generated or executed by Copy Task Generator 250. Each instance of the copying processes or tasks (generated or executed by Copy Task Generator 250) may be configured to read and copy a respective one of the multiplicity of parallel copy groups from source table 210 over to target table 220.

Database copying tool 201 may be integrated with databases (and DBMS) or may be included in a business programming application (e.g., business application 202). Database copying tool 201 may be coded (at least from a perspective of high level commands and instructions) using a same or compatible programming language (e.g., Advanced Business Application Programming (ABAP) language) as business application 202. Database copying tool 201 and/or business application 202 may be hosted on one or more physical or virtual machines hosted on a computer network. Source table 210 may be stored in a database or database system (e.g., database 280) that is accessible to business application 202 and/or database copying tool 201 via a database Application Programming Interface (API) 281. In an example implementation, database API 281 may be an ABAP Database Connectivity (ABDC) API for a SQL interface of an application server based, for example, on ABAP Objects. Methods of ABDC may include methods, for example, for sending database specific SQL commands to the database 280 (in which source database table 210 resides) and processing the results. Methods of ABDC may further include methods for establishing and administering database connections.

Database copying tool 201 may include or be coupled to Database Interface 260 and/or an Open "Structured Query Language (SQL)" interface 270 via which it can access, for example, database 280 hosting source database table 210. Database copying tool 201 may be configured, for example, to retrieve or read source table 210 residing in database 280 via Database Interface 260 and/or Open "Structured Query Language (SQL)" interface 270. Database copying tool 201 may further include a Data Adaption Module 290, which may be configured to modify or adapt the structure of data records read from source table 210 to conform to the structure or format of data records in target table 220 (which structure or format may, for example, be client system-determined) before the read data records are copied over or inserted in target table 220.

As noted previously, database copying tool 201 and/or business application 202 may be hosted on one or more physical or virtual machines hosted on a computer network. FIG. 2 shows, for example, database copying tool 201 (and business application 202) hosted on a computing device 20 (e.g., a desktop computer, a mainframe computer, a personal computer, a mobile computing device, a laptop, a tablet, or a smart phone), which may be available to a user. Computing device 20, which includes an O/S 21, a CPU 22, a memory 23, and I/O 24, may further include or be coupled to a display 25 (which includes, for example, a user interface (UI) 300).

Although computer 20 is illustrated in the example of FIG. 2 as a single computer, it may be understood that computer 20 may represent two or more computers in communication with one another. Therefore, it will also be appreciated that any two or more components of database copying tool 201 (and/or business application 202) may similarly be executed using some or all of the two or more computing devices in communication with one another. Conversely, it also may be appreciated that various components illustrated as being external to computer 20 may actually be implemented therewith.

Figure 3:
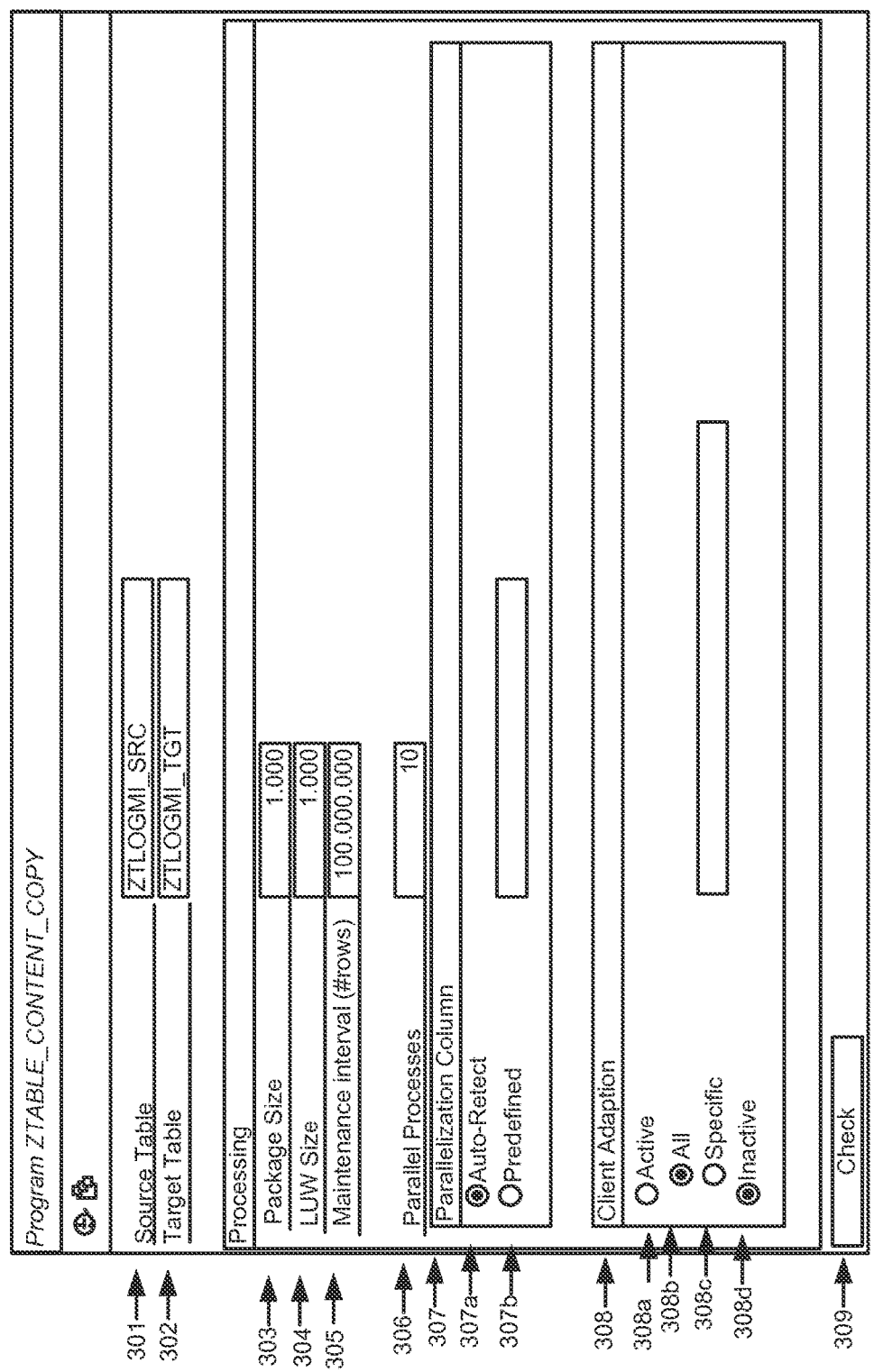
FIG. 3 is a schematic illustration of an user interface generated by a database copying system for receiving input parameters to configure and setup the parallel copying processes or tasks of FIG. 2 to copy contents of the source database table to the target table, in accordance with the principles of the disclosure herein.

With reference to the components of database copying tool 201 shown in FIG. 2, Copy Controller 230 may be an executable program that provides a user interface (e.g., UI 300, FIG. 3. UI 800, FIG. 8) for receiving instructions to copy source table 210 to target table 220, and for receiving input parameters limiting or defining the parallel copying of source table 210 to target table 220. In an example implementation of database copying tool 201, the input parameters defining the copying of source table 210 to target table 220 may (as shown, for example, in UI 300, FIG. 3) include parameters identifying the source and target tables (e.g., source table name 301 and target table name 302), parameters (such as package size 303, Logical Unit of Work (LUW) 304, Maintenance Interval 305 and Parallel Processes 306) related to the configuration or set up of copying processes or tasks executed by Copy Task Generator 250.

Parameter package size 303 may specify an upper limit on a package size (i.e., a number of data records) used by a single copy task to read source data (e.g., source table 210). An actual value of a package size used by database copying tool 201 for a database roundtrip may be lower than the user-specified upper limit (e.g., package size 303) on package size, for example, when source table 210 is a wide table with a large amount of records. In such case or other cases, a database shared library (DBSL) buffer parameter may determine a maximum number of data records in each package read from the database in a single roundtrip by database copying tool 201. Parameter LUW size 304 may specify how many records inserted are at maximum part of a logical unit of work or, in other words, define after how many records insertions (e.g., in target table 220) a database commit is triggered at the latest. Parameter Maintenance Interval 305 may specify a threshold of number of data records at which a database interface method (e.g., "ON_TABLE_MAINTENANCE_INTERVAL") for database maintenance is called. Input parameter Parallel Process 306 may be a user-specified maximum number of parallel dialog work processes (e.g., ABAP dialogs) that can be used by database copying tool 201 for copying source table 210 over to target table 220. Database copying tool 201 may be configured to use fewer parallel dialog work processes than the user-specified maximum number if system 200 has inadequate free resources, for example, to support the user-specified maximum number of parallel dialog work processes.

The input parameters limiting or defining the parallel copying processes or tasks executed by Copy Task Generator 250 for copying source table 210 to target table 220 may further include a parameter Parallelization Column 307, which may identify a column in source table 210 as the parallelization column to be used for grouping data records in source table 210 (as previously described, for example, with reference to FIG. 1). Parameter Parallelization Column 307 may accept two input values (e.g., Auto-Detect or Predefined) as may be indicated, for example, by user-activation of radio button "Auto-Detect" 307*a* or radio button "Predefined" 307*b* on UI 300.

For the case where radio button Predefined 307*b* is activated, parameter Parallelization Column 307 may be taken to be a column name or identification which may be entered by the user, for example, in an input text field accompanying the radio button Predefined 307b on UI 300.

For the case where radio button Auto-detect 307b is activated, Parallelization Column 307 may be taken to be a column selected, for example, by Parallelization Column Detector 240 (as described below).

The input parameters limiting or defining the parallel copying processes or tasks executed by Copy Task Generator 250 for copying source table 210 to target table 220 may further include a parameter Client Adaption 308 related to a type of data adaptation or modification of the data records that may be performed (e.g., by Client adaptation module 290 as described below) so that the data records copied over from source table 210 conform to the structure or format of data records in target table 220. Parameter Client Adaption 308 may accept two input values (e.g., active or inactive) as may be indicated, for example, by user-activation of radio button "Active" 308a or radio button "Inactive" 308d on UI 300. An "Active" input value (308a) for parameter Client Adaption 308 may be further qualified as "All" or "Specific" as may be indicated, for example, by user-activation of radio button "All" 308b or radio button "Specific" 308d on UI 300. A value "Active—All" of parameter Client Adaption 308 may indicate that the data records copied over from source database table 210 need to be adapted to a current system client value for the structure or format of data records in target table 220. A value "Active—Specific" of parameter Client Adaption 308 may indicate that the data records copied over from source database table 210 need to be adapted to the current system client value for the structure or format of data records in target table 220 only for specific clients. A value "Inactive" of parameter Client Adaption 308 may indicate that source table 210 data records should be copied 1:1 to target table without any modification for all clients.

With renewed reference to FIG. 2, in parallel copying tool 201, Parameter Validation module 232 may be configured to validate the input parameters (e.g., parameters 301-308) entered on UI 300 so that processes for copying source table 210 to table 210 can be properly set up in parallel copying tool 201. An example validation process implemented using Parameter Validation module 232 may, for example, include conforming that source and target tables exist, checking whether the source and target tables contain data, checking whether the source and target table structures differ, and checking whether the source and target table structures are compatible, and checking whether the degree of parallelization implied by the input parameters can be properly handled by system 200 setup and available resources. The parameter validation processes of Parameter Validation module 232 may be triggered, for example, on execution of parallel copying tool 201 or by user activation (e.g., clicking) of a "Check" button 309 on UI 300.

As noted previously, for the case where radio button Auto-Detect 307b is activated (FIG. 3), Parallelization Column 307 may be set to be a column selected, for example, by Parallelization Column Detector 240. Copy controller 230 and/or Process Validation module 232 may be configured, for example, to automatically call Parallelization Column Detector 240 to select a value for Parallelization Column 307 when radio button Auto-Detect 307b is activated on UI 300.

Parallelization Column Detector 240 may be configured to algorithmically select a column of source table 210 as Parallelization Column 307 based, for example, on an algorithm designed to optimize parallel copying of source table 210 to target table 220 by parallel copying tool 201. In some implementations, the parallel copying of source table 210 to target table 220 may be optimal, for example, when the parallel copy groups (e.g., in set 112) resulting from the selection of Parallelization Column 307 (as described above with reference to FIG. 1) have, at least on average, a pre-defined optimal copying size (e.g., a size of about 100,000 data records) and each of the parallel copy groups (e.g., in set 112) includes less than a pre-defined threshold number of data records (e.g., less than about 1 million data records).

Figure 4:
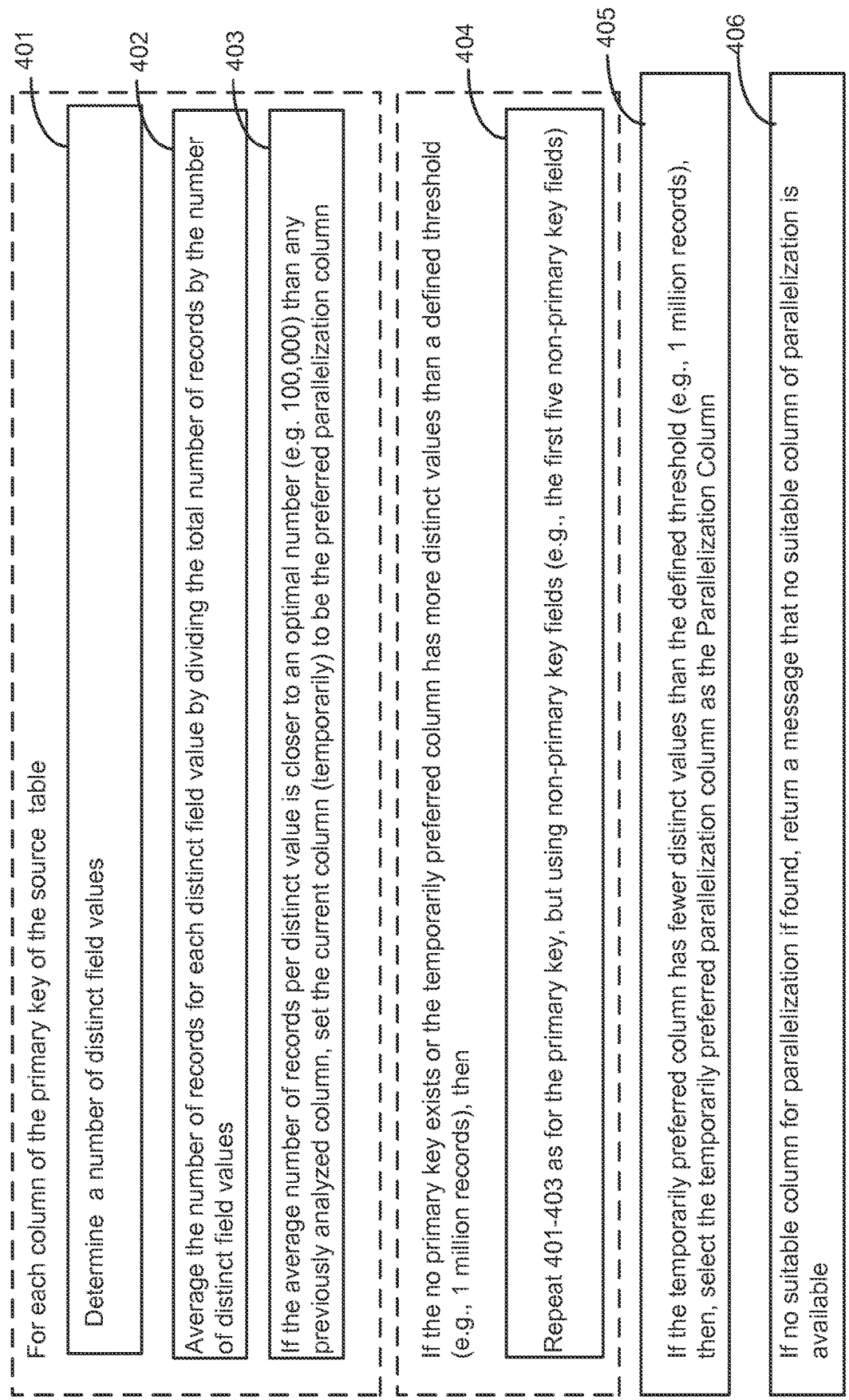
FIG. 4 is an illustration of an example algorithm for selecting a column in source table as parallelization column, in accordance with the principles of the disclosure herein.

FIG. 4 shows an example algorithm 400 that may be used by Parallelization Column Detector 240 to select a column in source table 210 as Parallelization Column 307, in accordance with the principles of the disclosure herein.

Algorithm 400 may involve, for each column of the primary key (of source table 210), determining the number of distinct field values (401), determining an average number of data records for each distinct field value (e.g., in set 112) by dividing the total number of data records in the source table by the number of distinct field values in the column (402), and if the average number of data records per distinct field value is closer to an optimal number (e.g., about 100,000 data records) than any previously analyzed column, setting the current column to be a temporarily preferred parallelization column.

If no primary key exists or if the temporarily preferred column has more distinct field values than a pre-defined threshold (e.g., 1 million data records), algorithm 400 may involve repeating 401-403 (as described above for the primary key), but using non-primary key fields (e.g., the first 5 non-primary key fields) (404).

If the temporarily preferred parallelization column has fewer distinct field values than the pre-defined threshold (e.g., 1 million data records), algorithm 400 may involve selecting the temporarily preferred parallelization column as Parallelization Column 307 (405).

If no suitable column for parallelization if found, algorithm 400 may involve returning a message (e.g., to Copy Controller 230 and/or Process Validation module 232) that no suitable column of parallelization is available (406). In response to the non-availability of a suitable column of parallelization, parallel copying tool 201 may revert to a sequential or serial processing mode to copy source table 210 over to target table 220.

The algorithmic search by Parallelization Column Detector 240 for a suitable Parallelization Column 307 based on determination of the number of distinct column values in a column, column-by-column, as described above, may be a long running process as it may involve accessing and reading database 280 repeatedly. To reduce processing time, Database Interface 260 in database copying tool 201 may be configured to optimize gathering the required values for determining or selecting a column as the Parallelization Column 307, for example, by using interface methods involving database specific hints.

In an example implementation, Database Interface 260 may be configured for general data handling, for example, for use when database 280 is a database with a generic database API 281. Database Interface 260 may be configured to use standard SQL predicates as COUNT and DISTINCT to increase a likelihood that the implementation can be used for a wide range of databases from a functional perspective. The interface methods used in Database Interface 260 may, for example, include method "Get_Count", which may execute the SQL statement SELECT COUNT(*) FROM <table_name> via ADBC to get a number of records in source table 210 residing in database 280.

In another example implementation, Database Interface 260 may be configured for customized data handling for non-generic databases (e.g., when database 280 is a specific or specialized database, for example, a database with online analytical processing (OLAP) tools). The interface methods used in Database Interface 260 for customized data handling may, for example, include method "GET_HINT_GET_COUNT", which may override or extend SQL statement SELECT COUNT(*) FROM <table_name> and return text "WITH HINT(OLAP_PARALLEL_AGGREGATION)".

Figure 5:
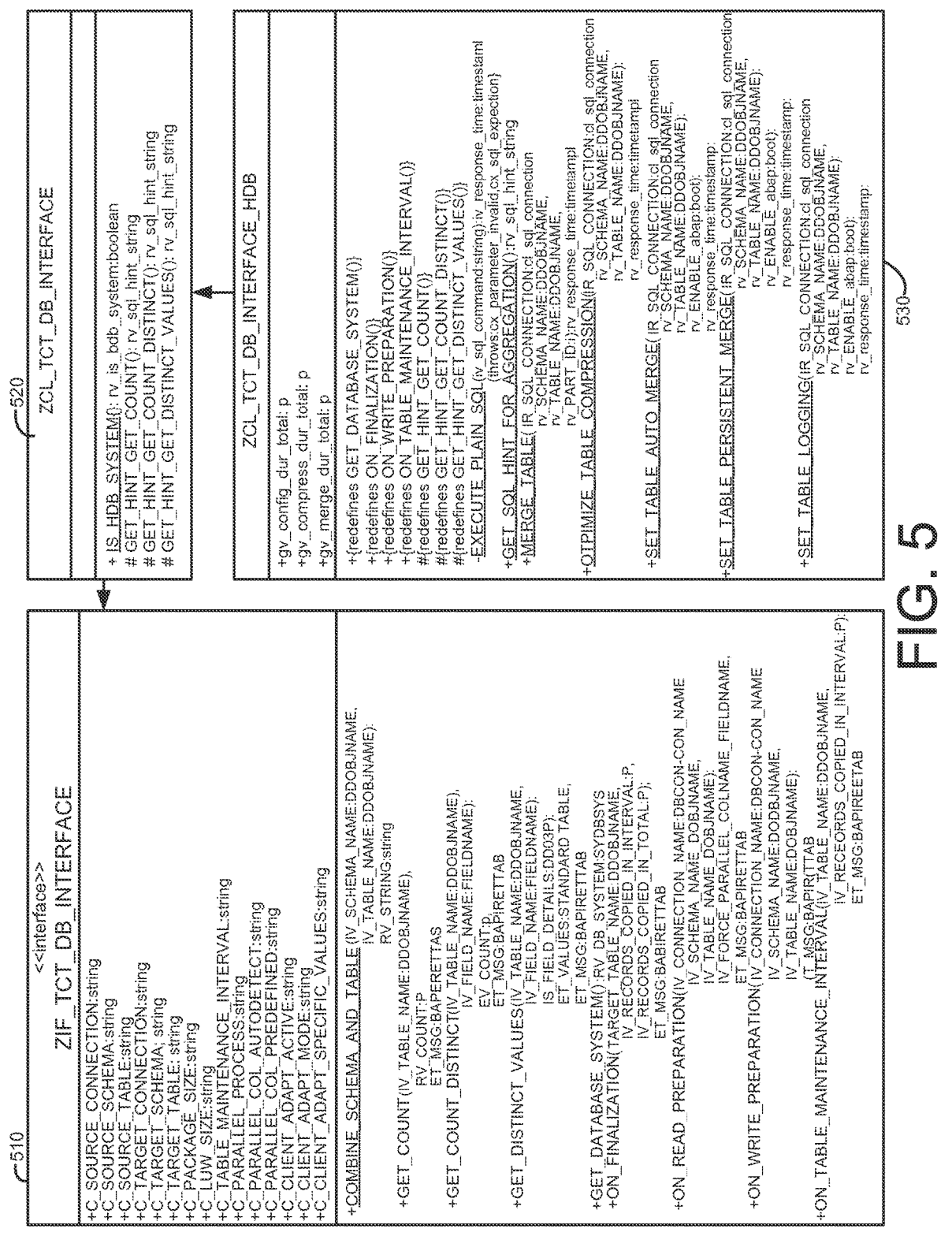

FIG. 5 shows an example Class diagram 500 for methods and objects that may be available in Database Interface 260. In Class diagram 500, Class 510 may include example methods for general data handling, and Classes 520 and 530 may include example methods for customized data handling for non-generic databases, as discussed above. As shown in the figure, Class 520 may include methods that are called to extend SQL statements by database specific hints.

In contrast to Database Interface 260, Open SQL interface 270 may be a database independent interface from an application point of view. In example implementations, Open SQL interface 270 may be part of parallel copying tool 201 or an external interface called by parallel copying tool 201 to read or retrieve data (e.g., source data table 210) from either generic or non-generic databases (e.g. database 280).

In example implementations of system 200, after input parameters (e.g., parameters 301-308) have been validated, Parallelization Column 307 selected, and a multiplicity of parallel copy groups in source table 210 identified, Copy Task Generator 250 in parallel copying tool 210, may execute instances of copy processes or tasks to copy the multiplicity of parallel copy groups (i.e. "data packages") in source table 210 over to target table 220 in parallel.

Each single instance of the copy processes or tasks may open a database cursor via Open SQL interface 270 to enable data package processing, which may be required, for example, in high volume situations. For each data package, the processing logic may include, after having read a data package (e.g., a parallel copy group of data records) from source table 210, adapt the read values dependent on a current configuration (based on input parameters 301-308) of parallel copying tool 210. For example, when source table 210 and target table 220 have different structures, the processing logic may include a mapping based, for example, on the column or field names used in source table 210 and target table 220. The mapping may be performed, for example, by calling, processes of Column Name Mapping 292 module in Data Adaption module 290. When the source data needs to be adapted (e.g., as indicated by Input parameter Client Adaption 308), the processing logic may include processes overriding the source data package values with the current system client values (by calling, for example, processes of Client Adaption 291 module in Data Adaption module 290). After the required mapping and/or client adaption of the data package values are performed, the processing logic may include inserting the data package into target table 220.

When the copy processes or tasks are called by parallel copying tool 201 and a database table maintenance interval or threshold is defined, the processing logic may include checking whether the table maintenance threshold has been reached and accordingly calling or triggering a corresponding table maintenance method (e.g., "ON_TABLE_MAINTENANCE_INTERVAL") of the database interface 281 after all currently running copy tasks are completed. Parallel copying tool 201 may initiate or start new parallel copy tasks after table maintenance is completed.

After inserting the data package into target table 220, the processing logic may include closing the database cursor (which was opened for the single instance of the copy processes or tasks via Open SQL interface 270 to enable data package processing).

Database copying tool 201, which is described above with reference to FIGS. 2-5, may be utilized to copy database contents (e.g., source table 210) to target table 220 in a same database system as may be allowed by use of Open SQL interface 270.

Figure 6:
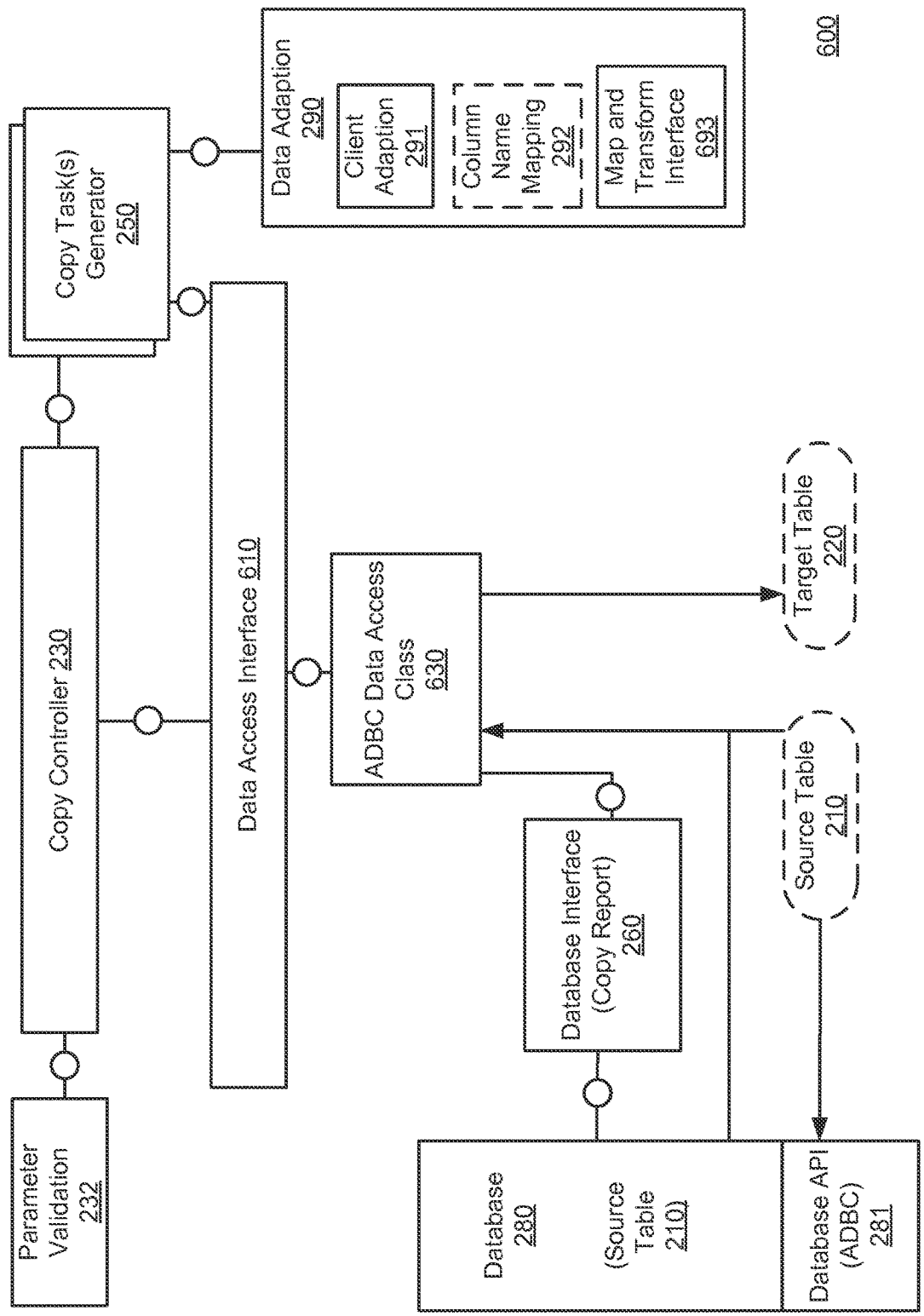
FIGS. 6 and 7 are block diagrams illustrating example components of other database copying tools that may be used to copy data records from a source table residing in a database system to a target table, which may reside in the same database system or another database system, in accordance with the principles of disclosure herein.
Figure 7:
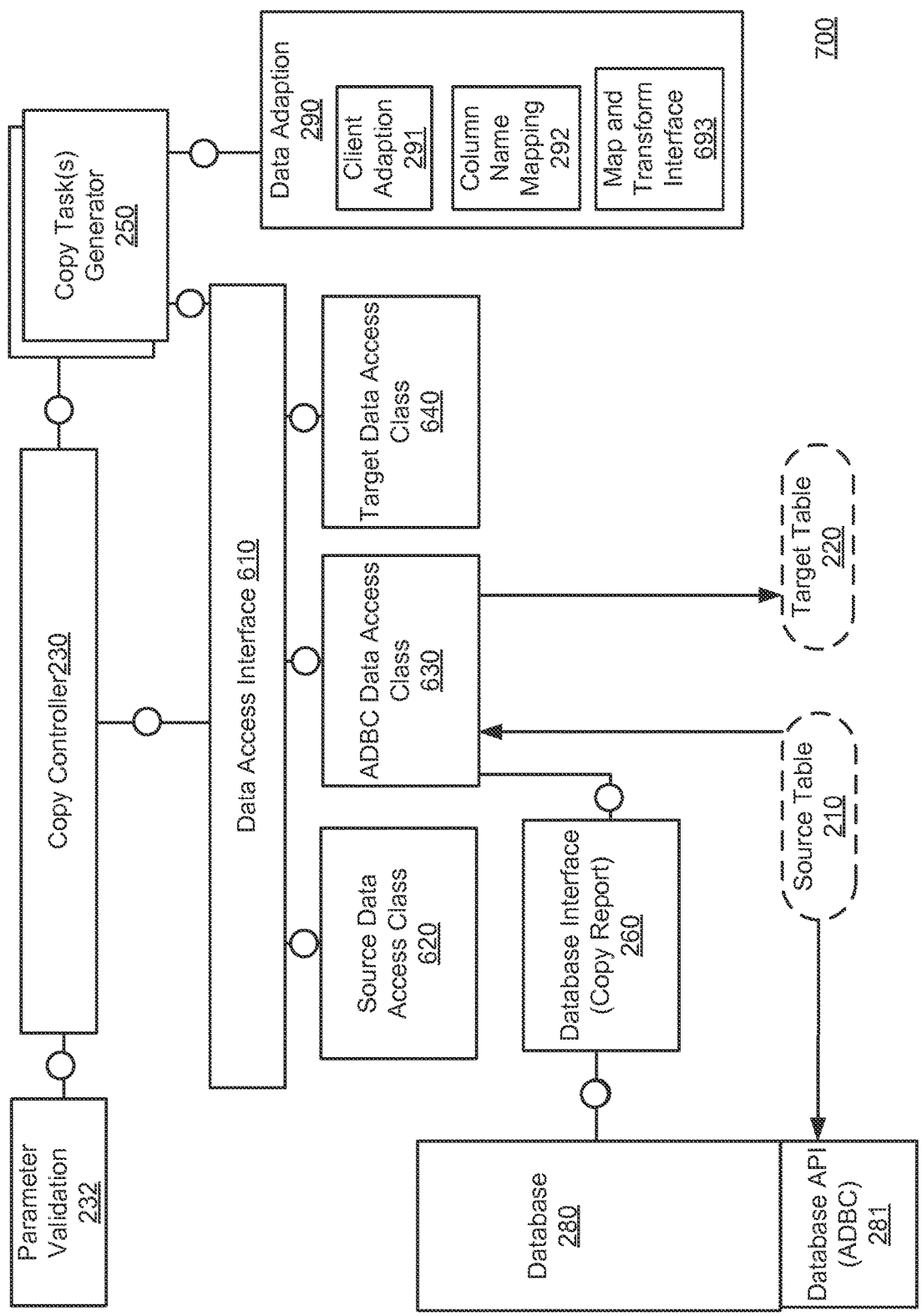

FIGS. 6 and 7 show example components of other database copying tools (e.g., database copying tool 600 and database copying tool 700) that may be configured to copy data records (e.g., source table 210) from a source database (e.g., database 280) to target table 220, which may reside in the same database system or different database systems, in accordance with the principles of disclosure herein.

With reference to FIGS. 6 and 7, database copying tools 600 and 700, like database copying tool 201, may include Copy Controller 230, Parameter Validation Module 232, Parallelization Column Detector 260 (not shown), Data Adaptation Module 290, and Database Interface 260. Database copying tool 600 may further include a data access abstraction layer (e.g., Data Access Interface 610) and a defined or concrete set of ADBC interface objects and methods (e.g., ADBC Data Access Class 630) for handling database accesses. In contrast to an Open SQL interface (e.g., Open SQL interface 270, FIG. 2), the database accesses allowed by Data Access Interface 610 and ADBC Data Access Class 630 to database copying tool 600 may not be limited to database tables residing the same database system as the instance schema but may include access to database tables residing on database systems other than the instance schema. In other words, ADBC Data Access Class 630 may allow access and copying even when the source database and target database object types or classes are different.

In certain use cases, data records in the source database (e.g., database 280) may be "sensitive" data records, which include sensitive private or confidential information (e.g., social security numbers, HIPPA protected health information, customer data, etc.) that should not be copied over to another database system or computer. However, the sensitive data records in the source database (e.g., database 280) may yet include other non-sensitive information which may be readily shared or copied over to other database systems, for example, for testing or other valid or legitimate purposes. The database copying solutions (e.g., solution 100) described herein may be extended to allow copying of the data records from one database system to another database system while securing the sensitive private or confidential information from disclosure. In an example database copying solution, the sensitive private or confidential information in the data records may be anonymized, randomized or scrambled to secure the sensitive private or confidential information before the data records are copied over to the target structure, in accordance with the principles of the disclosure herein.

The database copying tools described herein (e.g., database copying tools 600) may be configured to anonymize or scramble data under "sensitive" columns headings in data records before the data records are transferred or copied over from the source database to the target table. For this purpose, the database copying tools (e.g., database copying tool 600) may include a Map and Transform Interface 693, which may be configured to allow individual mapping of columns from the source to the target structure, and column-by-column transformation or scrambling of the values to be transferred as may be needed, for example, to secure the sensitive private or confidential information under sensitive columns headings.

Map and Transform Interface module 693 may be realized, for example, via a class that extends the abstract ABAP class "ZCL_TCT_ABS_DATA_MODIFICATION" that includes an abstract "MAP_AND_TRANSFORM" method (which may be a generic method) and includes additional helper methods for data scrambling.

Abstract method MAP_AND_TRANSFORM may provide an import parameter that describes the compatibility of the source table and target table structures, for example, as parameter values 'F': Full, 'P': Partial, and 'N': None. Full compatibility 'F' may allow direct assignment as read data records or data packages as all columns in the source and target structures may be identical in name and order. Partial compatibility 'P' (which indicates that not all columns in the source and target structures are identical in name and order) may require attention to which columns in the read data records or data packages should be mapped from the source and target structures as the columns in the two structures may differ either in name or order. The case of no compatibility 'N' may correspond to a situation in which the column names in the source and target structures are all different.

Abstract method MAP_AND_TRANSFORM may further provide another import parameter which contains a data package read from the source table. Available "changing" parameters may be the generic table type for the data package to be copied into the target table, and a flag indicating whether the data should be inserted directly or updated before insertion in the target structure.

To assign implemented Map and Transform Interface 693 abstract class (e.g., ZCL_TCT_ABS_DATA_MODIFICATION) to database copying tool 600, the class name may be provided to a corresponding parameter of the tool. If the Map and Transform Interface class is specified to be used for a copy process by database copying tool 600, database copying tool 600's internal column name mapping feature (e.g., Column Name Mapping module 292) may be deactivated.

The additional helper methods for data scrambling, which may be included in Map and Transform Interface module 693, may, for example, include a generic static method "GET_CONSISTENT_MAPPING", "Get random value" methods, and "Get Scramble value" methods.

Method GET_CONSISTENT_MAPPING may use a two-column table consisting of only two columns, for example, "ORIG" (storing the original value) and "MAP" (storing the mapped value), as a working table for mapping distinct original values to mapped values. Use of the two-column table may allow consistent mapping of data record field values to scrambled values.

The Get random value methods may include static methods for returning random values for corresponding data types (e.g. Decimal, Integer, String, Integer String, etc.) for the original values. The Get random value method may have import parameters that specify a length of the returned random values.

The Get Scramble value methods may include methods for returning scrambled values of corresponding data types (e.g. Decimal, Integer, String, Integer String, etc.) for the original values. The Get Scramble value methods, which may include a "changing" parameter, may determine a length of the original value that is passed into the changing parameter and then return a random or scrambled value with exact same length the original value.

Database copying tool 600 with its data scrambling or randomizing capabilities may be deployed on an integrated technology computing platform (e.g., NetWeaver™), which may span or cover diverse computing and database systems. Such deployment of database copying tool 600 on an integrated technology computing platform may enable copying of scrambled data records from a source table on one system (e.g., System A) to a target table, which may be on System A or on another system (e.g., System B). Database copying tool 600 may itself be deployed on either System A, System B, or a third system (e.g., System C).

The database copying solutions (e.g., solution 100) and the database copying tools described herein (e.g., database copying tools 201 or 600) may be extended or modified for use for other purposes (e.g., data generation) than copying data from a source table to a target table. The extended or modified database copying tools (e.g., database copying tool 700. FIG. 7) may have capabilities for reading and storing of data beyond what may be needed for copying data from a source table to a target table.

An example use case may involve generation of data to populate a "demonstration" database table that may be used for demonstrating the functionalities of a newly developed or marketed business application (e.g., a customer activity application for the retail industry). The customer activity application may be programmed to analyze a large number of point-of-sale transactions data collected from a large number of retail stores over months and aggregated, for example, as a Point-of-Sale Transaction Data table. However, to demonstrate the functionalities of the newly developed or marketed customer activity application to a potential customer, an actual or real Point-of-Sale Transaction Data table (e.g., with millions or more of data records) may not be available. Actual or real Point-of-Sale Transaction Data tables may have been assembled by, or for, other customers; however, for confidentiality reasons, it may not be feasible to use the other customer data to demonstrate the functionalities of the customer activity application to the potential customer. In such a scenario, it may be useful to construct a simulated Point-of-Sale Transaction Data table to demonstrate the functionalities of the newly developed or marketed customer activity application to the potential customer.

The database copying tools (e.g., database copying tools 201 and 600) described herein may be extended to include processes for generating data to populate a database table (e.g., a simulated Point-of-Sale Transaction Data table). FIG. 7 shows an example database copying tool 700, which may be an extension of database copying tool 600 with additional capabilities to generate large amounts of data to populate a database table (e.g., source table 210, which may be a simulated Point-of-Sale Transaction Data table). Database copying tool 700 may also be configured to generate data for the database table (e.g., source table 210) at runtime within a cloud instance of the customer activity application, for example, to make simulated recent point-of-sale transactions data available for analysis by the customer activity application.

Database copying tool 700 may have capabilities or functionalities for reading and storing of data provided by a Source Data Access Class module 620 and a Target Data Access Class module 640, both of which may be coupled to Data Access Interface 610, in accordance with the principles of the disclosure herein.

In an example implementation, both Source Data Access Class module 620 and Target Data Access Class module 640 may extend an abstract class "ZCL_TCT_ABS_DATA_ACCESS" in Data Access Interface 610 and also implement abstract methods (e.g., PREPARE_READ, PREPARE_WRITE, FINALIZE_TASK, INIT_READ_TASK, INIT_WRITE_TASK, READ_NEXT_PACKAGE, WRITE_NEXT_PACKAGE, MAINTAIN, FINALIZE, and GET_PACKAGE_STRUCTURE).

In the example use case described above, since the customer activity application may store point-of-sales transactions data in a single database table (i.e., the Point-of-Sale Transaction Data table). Data generation capability to construct only a single simulated data table (e.g., source table 210) may be needed to demonstrate the functionalities of the customer activity application to the potential customer. A second data table (e.g., target table 220) may not be needed. Accordingly, only the Source Data Access Class module 620 may be implemented in parallel copying tool 700 to provide the data generation capability needed to construct the simulated Point-of-Sale Transaction Data table for analysis by the customer activity application.

For the example use case described above, the Source Data Access Class may provide data generation capability in parallel copying tool 700, for example, as class "ZCL_TC-T_RWDA_TLOG_GEN". This class may include a conversion method which transforms the class-generated business object into the flat database table format. To use the conversion method, a parameter "TARGET_TYPE" may be set to "TLOGF" and a parameter "TARGET_TABLE" may be provided.

Configuration parameters for specific data access classes in parallel copying tool 700 may be routed through a user interface (e.g., user interface (UI) 800, FIG. 8) via range filters in a selection option screen.

UI 800, like UI 300, may be configured for receiving input parameters limiting or defining the parallel copying of source table 210 to target table 220 (such as package size 303, LUW 304, Maintenance Interval 305 and Parallel Processes 306, etc.). User interface 800 may be further configured to receive additional input parameters identifying the source and target databases on which source table 201 and target table 202 reside. The source database on which source table 201 resides may be identified, for example, by input parameters entered in connection text field 801a, schema text field 801b, and table text field 301, shown to the right of database radio button 801 in UI 800. Similarly, the target database on which target table 201 resides may be identified, for example, by input parameters entered in connection text field 803a, schema text field 803b, and table text field 302, shown to the right of database radio button 803 in UI 800.

UI 800 may also be configured to receive input parameters identifying the source and target classes (e.g., for configuring or setting up tasks of Source Data Access Class module 620 and a Target Data Access Class module 640). The source and target classes may be identified, for example, by input parameters entered in text fields source class name 802a and target class name 804a (shown to the right of class source radio button 802 and target radio button 8042, respectively) in UI 800. UI 800 may also be further configured to receive input parameters for configuring or setting up tasks of Map and Transform Interface module 693 (e.g., via input parameters entered in text field 805).

Figure 9:
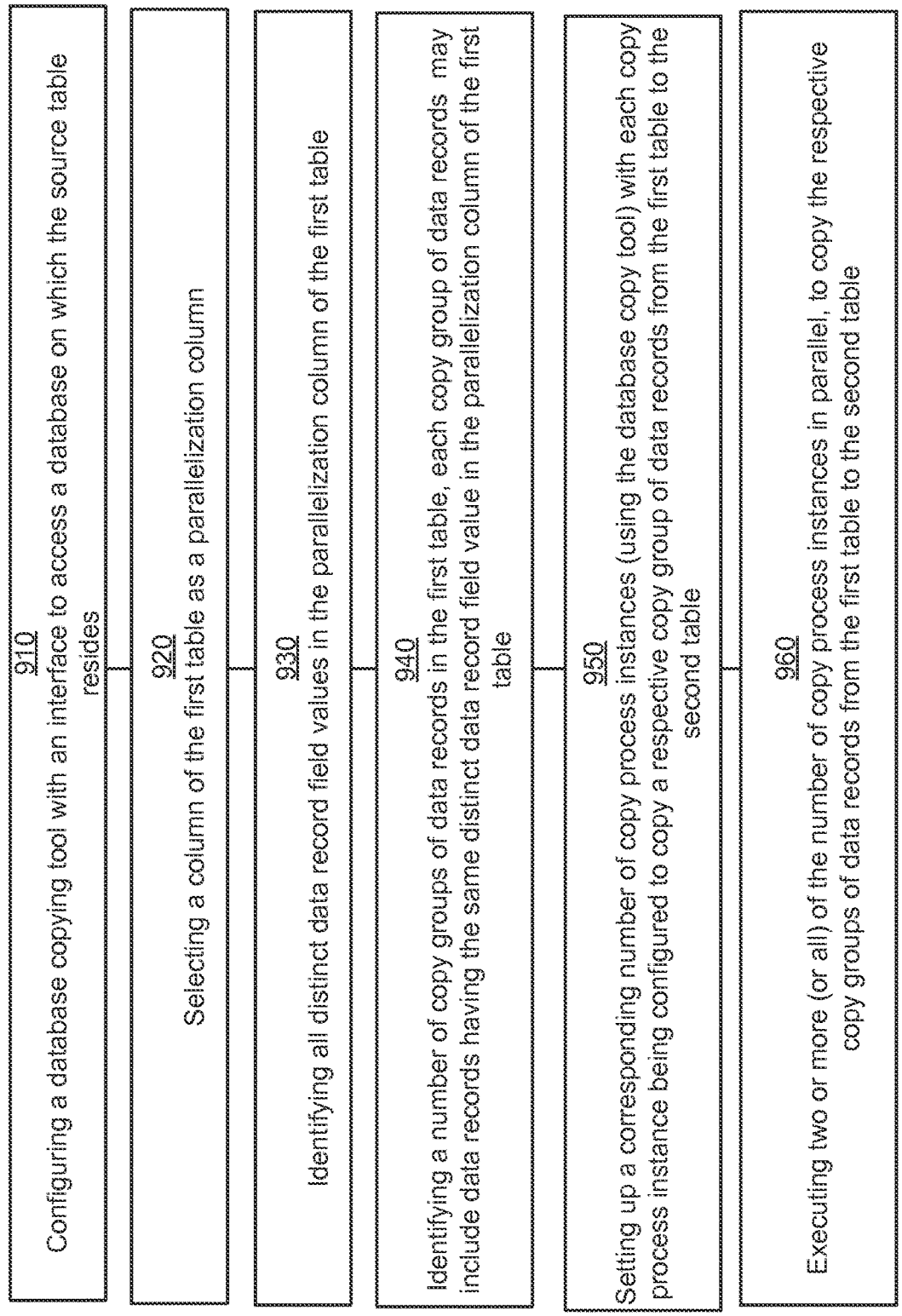
FIG. 9 is an illustration of an example computer-implemented method for copying the contents of a first table to a second table, in accordance with the principles of the disclosure herein.

FIG. 9 shows an example computer-implemented method 900 for copying the contents of a first table (e.g., source table 210) to a second table (e.g. target table 220), in accordance with the principles of the disclosure herein. The first table may include a number of data records arranged as rows in the table with each data record having data field values under respective field or column headings in the table.

Method 900 may be implemented using a database copying tool, which may be hosted on a computer network that includes or is linked to the database on which the source table resides. Method 900 may include configuring the database copying tool with an interface to access the database (e.g., a business data store or warehouse) on which the source table resides (910). The database copying tool may be coupled to or linked to a business application hosted on the computer network and, like the business application, may be coded using a business application programming language (e.g. ABAP, etc.).

Method 900 may further include selecting a column of the first table as a parallelization column (920), identifying all distinct data record field values in the parallelization column of the first table (930), and identifying a number of copy groups of data records in the first table (940). Each copy group of the data records may include the data records in the first table, which have the same distinct data record field value in the parallelization column of the first table.

Method 900 may further include setting up a corresponding number of copy process instances (using the database copy tool) with each copy process instance being configured to copy a respective copy group of data records from the first table to the second table (950).

Method 900 may involve executing the copy process instances serially, or as system conditions and table or data record characteristics may permit, execute two or more (or all) of the number of copy process instances in parallel, to copy the respective copy groups of data records from the first table to the second table (960).

Method 900 may, for example, involve determining a size of each of the copy groups of the data records, and when the size of each of the copy groups of the data records is smaller than a pre-determined threshold size, executing the corresponding number of copy processes in parallel. In example business or other large database scenarios, the pre-determined threshold size may be about 1 million data records.

In case a copy group of the data records is greater than a pre-determined threshold size, method 900 may involve selecting another column of the first table as the parallelization column.

Selecting a column of the first table as a parallelization column may include analyzing a plurality of columns of the first table, column-by-column, and determining, for a current column, an average number of data records corresponding to the distinct data record field values in the current column. When the average number of data records corresponding to the distinct data record field values in the current column is closer to a pre-determined optimal number than for any previously analyzed column, the current column may be set or identified as a temporarily preferred parallelization column.

The plurality of columns of the first table that are analyzed may include a plurality of primary key columns when the first table has a primary key, and may further include a plurality of non-primary key columns when the first table does not have a primary key or when the temporarily preferred column has more distinct field values than a pre-defined threshold. Method 900 may involve selecting the temporarily preferred parallelization column as the parallelization column if the temporarily preferred parallelization column has fewer distinct data record field values than the pre-defined threshold number.

In some situations (e.g., when the first table and the second table have different structures or column headings), method 900 may include setting up processes to adapt a structure of a data record read from the first table to match a structure of the second table. In other situations (e.g., when data records in the first table include private or confidential information), method 900 may include setting up a process to scramble at least one data record field value of a data record read from the first table before copying or inserting the read data record in to the second table.

The various systems and techniques described herein may be implemented in digital electronic circuitry, or in computer hardware, firmware, software, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for maintaining data structures by parallel copying of data records from a first table residing in a database to a second table, the data records arranged as rows in the first table, each data record having a data record field value in a respective field column of the first table, the computer-implemented method comprising:
    coupling the database with a database copying tool having an interface to access the first table residing in the database, the database copying tool being included in a software application;
    at the database copying tool, receiving instructions by way of the software application to parallel copy the first table to the second table and parameters that limit the parallel copying of the first table to the second table based at least in part on computing resources available to the software application, the parameters including a package size, a logical unit of work (LUW), a maintenance threshold, a maximum number of parallel processes, and a parallelization column indicator;
    selecting a column of the first table according to the parallelization column indicator as a parallelization column, the parallelization column indicator triggering analyzing each of a plurality of columns of the first table, determining, for each column, all distinct field values of a current column, determining an average number of data records including rows corresponding to the distinct data field values in the current column, and setting the current column to be the parallelization column when the average number of data records corresponding to the distinct data record field value in the current column is closer to a pre-determined optimal number than for other columns of the plurality of columns in the first table;
    identifying, based on the selected parallelization column, all distinct data field values in the parallelization column of the first table;
    identifying, based on the selected parallelization column, a number of parallel copy groups of data records including rows, each parallel copy group of the data records including data records having the same distinct data record field value in the parallelization column of the first table; and
    setting up a number of parallel copy processes to run as time-limited dialog processes on a technology platform of the database, each parallel copy process configured to copy a respective parallel copy group of data records from the first table to the second table, the copy including an adaptation to a format and/or structure of the second table, the adaption including anonymizing at least a portion of a parallel copy group;

executing instances of the parallel copy processes to copy the respective parallel copy groups in the first table over to the second table in parallel;

checking whether the maintenance threshold has been reached and accordingly calling a table maintenance method after all currently running copy tasks are completed; and starting new parallel copy tasks after table maintenance is completed.

2. The computer-implemented method of claim 1, further comprising:

determining a size of each of the parallel copy groups of the data records; and when the size of each of the parallel copy groups of the data records is smaller than a pre-determined threshold size, executing the corresponding number of parallel copy processes in parallel.

3. The computer-implemented method of claim 1, wherein the pre-determined threshold size is about 1 million data records.

4. The computer-implemented method of claim 1, further comprising:

determining a size of each of the parallel copy groups of the data records; and when the size of each of the parallel copy groups of the data records is greater than a pre-determined threshold size, selecting another column of the first table as the parallelization column.

5. The computer-implemented method of claim 1, wherein the plurality of columns of the first table analyzed include a plurality of primary key columns when the first table has a primary key, and further include a plurality of non-primary key columns when the first table does not have a primary key or when a temporarily preferred parallelization column has more distinct field values than a pre-defined threshold.

6. The computer-implemented method of claim 5, further comprising: selecting the temporarily preferred parallelization column as the parallelization column when the temporarily preferred parallelization column has fewer distinct data field values than the pre-defined threshold number.

7. The computer-implemented method of claim 1, wherein setting up a corresponding number of parallel copy processes includes setting up processes to adapt a structure of a data record read from the first table to match a structure of the second table.

8. The computer-implemented method of claim 1, wherein setting up a corresponding number of parallel copy processes includes setting up a process to scramble at least one data record field value of a data record read from the first table before copying the data record to the second table.

9. A computer system comprising at least one processor and at least one memory including program code, which when executed by the at least one processor causes operations comprising:

maintaining data structures by parallel copying of data records from a first table residing in a database to a second table, the data records arranged as rows in the first table, each data record having a data record field value in a respective field column of the first table;

coupling the database with a database copying tool having an interface to access the first table residing in the database, the database copying tool being included in a software application;

at the database copying tool, receiving instructions by way of the software application to parallel copy the first table to the second table and parameters that limit the parallel copying of the first table to the second table based at least in part on computing resources available to the software application, the parameters including a package size, a logical unit of work (LUW), a maintenance threshold, a maximum number of parallel processes, and a parallelization column indicator;

selecting a column of the first table according to the parallelization column indicator as a parallelization column, the parallelization column indicator triggering analyzing each of a plurality of columns of the first table, determining, for each column, all distinct field values of a current column, determining an average number of data records including rows corresponding to the distinct data field values in the current column, and setting the current column to be the parallelization column when the average number of data records corresponding to the distinct data record field value in the current column is closer to a pre-determined optimal number than for other columns of the plurality of columns in the first table;

identifying, based on the selected parallelization column, all distinct data field values in the parallelization column of the first table;

identifying, based on the selected parallelization column, a number of parallel copy groups of data records including rows, each parallel copy group of the data records including data records having the same distinct data record field value in the parallelization column of the first table; and setting up a number of parallel copy processes to run as time-limited dialog processes on a technology platform of the database, each parallel copy process configured to copy a respective parallel copy group of data records from the first table to the second table, the copy including an adaptation to a format and/or structure of the second table, the adaption including anonymizing at least a portion of a parallel copy group;

executing instances of the parallel copy processes to copy the respective parallel copy groups in the first table over to the second table in parallel;

checking whether the maintenance threshold has been reached and accordingly calling a table maintenance method after all currently running copy tasks are completed; and starting new parallel copy tasks after table maintenance is completed.

10. A non-transitory computer-readable storage medium that includes executable code, which when executed, causes a computer system to provide operations comprising:

maintaining data structures by parallel copying of data records from a first table residing in a database to a second table, the data records arranged as rows in the first table, each data record having a data record field value in a respective field column of the first table;

coupling the database with a database copying tool having an interface to access the first table residing in the database, the database copying tool being included in a software application;

at the database copying tool, receiving instructions by way of the software application to parallel copy the first table to the second table and parameters that limit the parallel copying of the first table to the second table based at least in part on computing resources available to the software application, the parameters including a package size, a logical unit of work (LUW), a maintenance threshold, a maximum number of parallel processes, and a parallelization column indicator;

selecting a column of the first table according to the parallelization column indicator as a parallelization column, the parallelization column indicator triggering analyzing each of a plurality of columns of the first table, determining, for each column, all distinct field values of a current column, determining an average number of data records including rows corresponding to the distinct data field values in the current column, and setting the current column to be the parallelization column when the average number of data records corresponding to the distinct data record field value in the current column is closer to a pre-determined optimal number than for other columns of the plurality of columns in the first table;

identifying, based on the selected parallelization column, all distinct data record field values in the parallelization column of the first table;

identifying, based on the selected parallelization column, a number of parallel copy groups of data records including rows, each parallel copy group of the data records including data records having the same distinct data record field value in the parallelization column of the first table; and setting up a number of parallel copy processes to run as time-limited dialog processes on a technology platform of the database, each parallel copy process
  configured to copy a respective parallel copy group of data records from the first table to the second table, the copy including an adaptation to a format and/or structure of the second table, the adaption including anonymizing at least a portion of a parallel copy group;
  executing instances of the parallel copy processes to copy the respective parallel copy groups in the first table over to the second table in parallel;
  checking whether the maintenance threshold has been reached and accordingly calling a table maintenance method after all currently running copy tasks are completed; and
  starting new parallel copy tasks after table maintenance is completed.

11. The computer system method of claim 9, further comprising:
  determining a size of each of the parallel copy groups of the data records; and when the size of each of the parallel copy groups of the data records is smaller than a pre-determined threshold size, executing the corresponding number of parallel copy processes in parallel.

12. The computer system method of claim 9, wherein the pre-determined threshold size is about 1 million data records.

13. The computer system method of claim 9, further comprising:
  determining a size of each of the parallel copy groups of the data records; and
  when the size of each of the parallel copy groups of the data records is greater than a pre-determined threshold size, selecting another column of the first table as the parallelization column.

14. The computer system method of claim 9, wherein the plurality of columns of the first table analyzed include a plurality of primary key columns when the first table has a primary key, and further include a plurality of non-primary key columns when the first table does not have a primary key or when a temporarily preferred parallelization column has more distinct field values than a pre-defined threshold.

15. The computer system method of claim 14, further comprising:
  selecting the temporarily preferred parallelization column as the parallelization column when the temporarily preferred parallelization column has fewer distinct data field values than the pre-defined threshold number.

16. The computer system method of claim 9, wherein setting up a corresponding number of parallel copy processes includes setting up processes to adapt a structure of a data record read from the first table to match a structure of the second table.

17. The computer system method of claim 9, wherein setting up a corresponding number of parallel copy processes includes setting up a process to scramble at least one data record field value of a data record read from the first table before copying the data record to the second table.

* * * * *